US011188364B1

(12) United States Patent
Sundaresan et al.

(10) Patent No.: US 11,188,364 B1
(45) Date of Patent: Nov. 30, 2021

(54) COMPILATION STRATEGY FOR A SHARABLE APPLICATION SNAPSHOT

(71) Applicant: International Business Machines Corporation, Armonk, NY (US)

(72) Inventors: Vijay Sundaresan, North York (CA); Mark Graham Stoodley, Ontario (CA); Andrew James Craik, North York (CA); Daniel Heidinga, Ottawa (CA); Ashutosh Mehra, Scarborough (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/005,605

(22) Filed: Aug. 28, 2020

(51) Int. Cl.
*G06F 9/44* (2018.01)
*G06F 9/455* (2018.01)
*G06F 8/41* (2018.01)
*G06F 16/11* (2019.01)

(52) U.S. Cl.
CPC .............. *G06F 9/4552* (2013.01); *G06F 8/41* (2013.01); *G06F 16/128* (2019.01)

(58) Field of Classification Search
CPC ...................................................... G06F 9/44
See application file for complete search history.

(56) References Cited

U.S. PATENT DOCUMENTS

| 10,402,225 | B2 | 9/2019 | Mitchell et al. |
| 2016/0124728 | A1* | 5/2016 | Mahaffey ............... G06F 11/34 717/158 |
| 2017/0083701 | A1* | 3/2017 | Tajalli .................... G06F 21/53 |
| 2018/0314749 | A1 | 11/2018 | Raja et al. |
| 2021/0096892 | A1* | 4/2021 | Nigro ....................... G06F 8/41 |

OTHER PUBLICATIONS

Cadden et al., SEUSS: Rapid Serverless Deployment using Environment Snapshots, Oct. 3, 2019.
Shillaker et al., FAASM: Lightweight Isolation for Efficient Stateful Serverless Computing, Jun. 19, 2020.

* cited by examiner

*Primary Examiner* — Jae U Jeon
(74) *Attorney, Agent, or Firm* — Garg Law Firm, PLLC; Rakesh Garg; Michael O'Keefe

(57) ABSTRACT

A method list is built for a currently executing application within a process virtual machine at a snapshot point, the method list comprising a set of methods capable of being executed by the currently executing application after the snapshot point, the snapshot point comprising an execution state of the currently executing application when a snapshot process is triggered. Profiling data of the currently executing application, collected prior to reaching the snapshot point, is committed, to a designated storage location. Using the profiling data and a just-in-time compiler of the process virtual machine, a method in the method list is compiled. Snapshot data comprising data of the execution state of the currently executing application at the snapshot point, including a result of the compiling, is stored.

20 Claims, 13 Drawing Sheets

COMPILATION STRATEGY FOR A SHARABLE APPLICATION SNAPSHOT

BACKGROUND

The present invention relates generally to a method, system, and computer program product for application compilation. More particularly, the present invention relates to a method, system, and computer program product for a compilation strategy for a sharable application snapshot.

A process virtual machine (VM), also called a language runtime, managed language runtime, application virtual machine, or Managed Runtime Environment, runs as an application on a host operating system. A process VM provides a platform-independent environment that hides details of the underlying hardware and operating system from an application running within, allowing the application to execute without modification on differently-configured platforms.

Several options are available for application execution in a process VM environment. First, the application's source code (in a high-level language such as Java) can be compiled into an executable file of processor-specific instructions, also called a native executable, native image, or native machine code. (Java is a registered trademark of Oracle America, Inc. in the United States and other countries.) At runtime, the environment loads the executable file into memory and executes the instructions. Although an executable file does not need additional processing at runtime, its static nature means that program code must be separated from data, and other dynamic language features require additional runtime support, resulting in a performance penalty. As well, because a static executable must include code to handle unexpected events, it includes rarely-executed code that takes up additional memory space.

Another option for application execution is to compile the application source code into an intermediate representation known as bytecode. Bytecode is similar to machine code for a particular processor or processor family, but is not processor-specific. Then, to execute bytecode of an application, a process VM uses an interpreter that converts one or a few bytecode instructions at a time into corresponding processor-specific instructions, which the particular processor then executes. Because the interpretation process adds execution time, interpreted code does not perform as well as a static executable, but is more adaptable to changing circumstances and avoids unneeded code processing.

A third option is a just-in-time (JIT) compiler, which converts portions of bytecode into processor-specific instructions (also called machine code) while an application is executing, and saves the compilation results for reuse. Compilation can be done per-file, per-method, or on another unit of code. A method, also called a procedure, subroutine, or function, is a block of code which only runs when it is called. Because the compilation process itself takes time, most process VMs improve overall application performance by compiling code only as it is about to be used (hence the term just-in-time compilation), compiling only code that is used most often (and interpreting the remainder of the code), or a combination of the techniques. Some process VMs collect profiling information as an application executes and use the profiling information to further refine both the decision of whether or not to compile a portion of code and improve the resulting compiled code.

Two presently-known examples of a process VM are the Common Language Runtime (CLR) and a Java Virtual Machine (JVM). The CLR, the virtual machine component of the Microsoft .NET framework, manages the execution of .NET programs, which can be written in several different source code languages. (.NET is a registered trademark of Microsoft Corporation in the United States and other countries.) A Java virtual machine (JVM) is a process VM that supports source code written in the Java language as well as other supported source code languages.

A snapshot point is a point in the execution flow of an executing application at which the execution state can be stored for restoration in another instance of a process VM. A snapshot is data of a process VM state at the snapshot point, including data relevant to resuming execution from the snapshot point in another instance of the process VM. For example, a snapshot typically includes JIT compiled code for part or all of the application, classes loaded up to the snapshot point, and the VM's heap which has been populated by running some or all of the initializers for the classes up to the snapshot point. Once the snapshot is saved, it can be used in another process VM instance to resume execution from the snapshot point by recreating and repopulating the necessary data structures in the new instance.

SUMMARY

The illustrative embodiments provide a method, system, and computer program product. An embodiment includes a method that builds, for a currently executing application within a process virtual machine at a snapshot point, a method list, the method list comprising a set of methods capable of being executed by the currently executing application after the snapshot point, the snapshot point comprising an execution state of the currently executing application when a snapshot process is triggered. An embodiment commits, to a designated storage location, profiling data of the currently executing application, the profiling data collected prior to reaching the snapshot point. An embodiment compiles, using the profiling data and a just-in-time compiler of the process virtual machine, a method in the method list. An embodiment stores snapshot data, the snapshot data comprising data of the execution state of the currently executing application at the snapshot point, the snapshot data including a result of the compiling.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
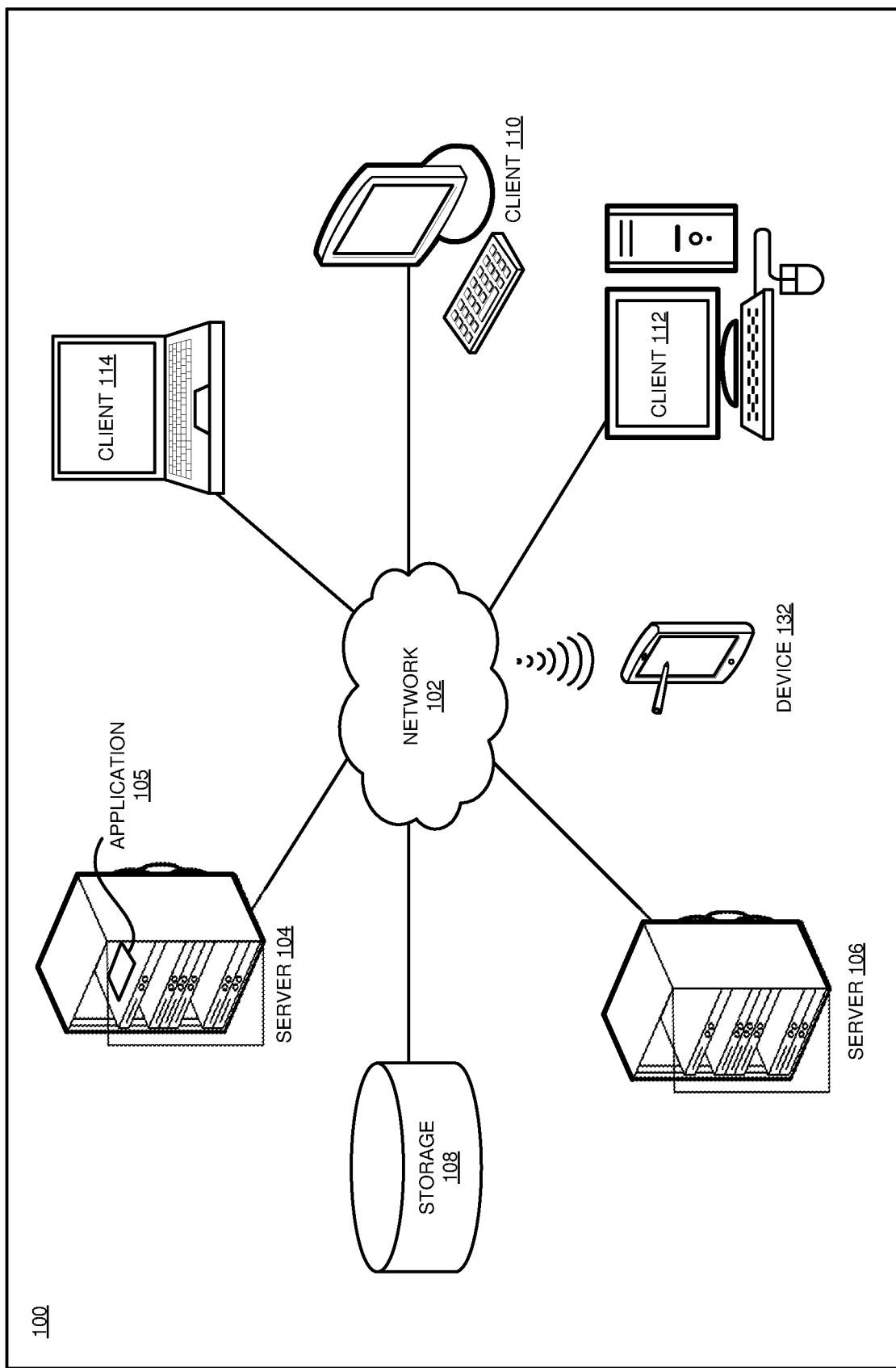
FIG. 1 depicts a block diagram of a network of data processing systems in which illustrative embodiments may be implemented.

The illustrative embodiments recognize that, in modern cloud computing, servers are typically removed from service when not needed to serve user requests, and returned to service when once again needed. However, the startup time necessary to bring a process VM and application from bootup to a full performance level can take more time than is available to respond to demand spikes, resulting in slower-than-expected client service and potentially violating a service level agreement between a service provider and its users.

The illustrative embodiments recognize that one presently available solution to the problem of quickly instantiating a new server instance is to compile the application code into a static native executable, while including some startup time and memory footprint optimizations. One example of this technique is GraalVM Native Image, in which a native image runs in a VM, Substrate VM, that includes the runtime components (e.g. a deoptimizer, garbage collector, thread scheduling etc.). (GraalVM is a registered trademark of Oracle International Corporation in the United States and other countries.) The resulting program has faster startup time and lower runtime memory overhead compared to a Java VM. However, SubstrateVM is only capable of supporting a subset of the Java programming language. As a result, implementing an existing application built using a traditional server based model within SubstrateVM may require extensive code changes.

The illustrative embodiments recognize that an improved solution to the problem of quickly instantiating a new server instance can be implemented using a snapshot capability, without requiring changes to an existing application. In particular, a process VM and application are instantiated and executed up to a desired execution point, then a snapshot is taken. Then, to create an additional instance of the application, the stored snapshot is restored in the new instance, skipping the original initialization process. As well, multiple instances can be created in parallel from one snapshot, saving additional time.

The illustrative embodiments also recognize that performing the snapshot at an appropriate time within application execution is important in the effectiveness of the improved solution. If the snapshot is performed late in application execution, open resources such as files and network connections might not be captured in the snapshot process, resulting in an incorrect restoration. However, a snapshot that has executed long enough to exercise common application code paths as they would be under a full load of client requests has already compiled code in those common code paths and made other adjustments to optimize the application for full performance. Conversely, if the snapshot is performed early in application execution, an incorrect snapshot due to open resources is not a risk, but too much additional code will need to be executed once the application is restored, increasing the time until the new instance is available to respond to client requests. In addition, code that has not yet been executed has also not yet had the opportunity to be profiled and optimized using the profiling information, increasing the time required for the application to reach an optimized performance level.

The illustrative embodiments recognized that other presently known solutions either use no profiling information or use profiling information from a prior training-type run of the application to generate profiling information for a subsequent compilation. Static compilers (e.g. to generate a native executable from C or C++ source code) often use this technique, but it requires separate training that users rarely take the time to perform.

The illustrative embodiments also recognize that the snapshot should be capable of sharing as much code as possible across multiple instances of a process VM executing on common hardware. Sharing code across multiple instances reduces the total memory requirement of the set of instances. However, the instances must all be restored from a common snapshot which was constructed taking shareability into account.

Thus, the illustrative embodiments recognize that there is a need for an improvement to a snapshot-based application instantiation solution, that optimizes application startup time and performance while preserving code sharing. The illustrative embodiments recognize that the presently available tools or solutions do not address these needs or provide adequate solutions for these needs. The illustrative embodiments used to describe the invention generally address and solve the above-described problems and other problems related to a compilation strategy for a sharable application snapshot.

An embodiment can be implemented as a software application. The application implementing an embodiment can be configured as a modification of an existing process VM snapshot system, as a separate application that operates in conjunction with an existing process VM snapshot system, a standalone application, or some combination thereof.

Particularly, some illustrative embodiments provide a method that builds, for a currently executing application within a process VM at a snapshot point, a list of methods capable of being executed after the snapshot point, commits collected profiling data of the application to a designated storage location, compiles the methods using the profiling data and a JIT compiler, and stores snapshot data including the compiled methods.

An embodiment begins executing an application within a process VM, with the process VM set to prevent compilation of any application code. Instead, application code is interpreted, using existing process VM functionality. Forcing code to be interpreted instead of compiled can incur a penalty in application throughput until reaching the snapshot point, because compiled code generally executes faster than interpreted code. However, delaying compilation until the snapshot point provides control over which portions of application code are included in the snapshot in compiled form, and maximizes the profiling data available for use during and after the snapshot. Controlling snapshot contents provides for adjustments to optimize application startup time and performance while preserving code sharing in application instances restored from a snapshot. In one embodiment, compilation prevention is implemented by starting the process VM in a special snapshot mode that alters normal JIT compiler heuristics, allowing profiling data collection while preventing compilation decisions based on the profiling data.

As the application executes within a process VM prior to a snapshot point, an embodiment collects profiling data of the application. Some non-limiting examples of the profiling data include, for conditional branches, how often is the condition true vs how often it is false and, for virtual calls, the class type of the object being used as the receiver of the call. Both types of profiling data help a JIT compiler optimize compiled code by predicting likely execution paths. In one embodiment, profiling data accumulates into one or more buffers. When a buffer approaches capacity, or at predetermined time intervals, an embodiment flushes, or commits, buffered data into a predetermined storage location, for use by the JIT compiler. In one embodiment, the predetermined storage location is a hash table of the JIT compiler. Other types of data structures, and other storage locations within a process VM, are also possible and contemplated within the scope of the illustrative embodiments.

A point within application execution is selected as the snapshot point, and an embodiment configures a snapshot handler to be triggered when application execution reaches the snapshot point. One embodiment receives the selected snapshot point during process VM initialization, for example as a parameter in a VM startup command or in a configuration file. Another embodiment allows a user to select a snapshot point by invoking a snapshot command, via an application program interface (API) from within the executing application. In another embodiment, the process VM selects a snapshot point using its own internal heuristics. For example, a process VM might invoke a snapshot when an executing application's rate of loading new classes has fallen below a threshold rate, indicating that the application has completed ramping up and reached a steady performance state that should be snapshotted. As another example, a process VM might invoke a snapshot when the application has begun to process representative work, for example, when a server application has processed at least one client request. An embodiment uses any presently known technique to trigger the snapshot handler at the desired point.

When the snapshot handler is triggered at the snapshot point, an embodiment builds a method list. The method list includes a set of methods capable of being executed by the currently executing application after the snapshot point. To build the method list, an embodiment consults a call stack of an active (i.e. called, but yet to complete execution when the snapshot point was reached) thread of the application. A call stack is a data structure that stores information about the active methods of a computer program, including the point to which each active method should return to when it finishes executing. In another embodiment, the method list includes a list of code units capable of being executed by the currently executing application after the snapshot point, in which the code units need not be methods.

In particular, to build the method list, if the code units in the method list are methods an embodiment selects a method that was currently executing when the snapshot point was reached. The embodiment adds the selected method to the method list and determines whether the selected method can call another method. If so, the embodiment adds the new method to the method list and determines whether the new method can itself call another method. The embodiment continues in this fashion, accumulating all the methods that could be called from the currently executing method. If another method was currently present in the call stack (i.e. the method had called the executing method) when the snapshot point was reached, the embodiment repeats the process with that method. In addition, if multiple threads of the application were executing, the embodiment repeats the process for another thread. Note that not all methods from all threads need be analyzed for inclusion in the method list. Instead, if an embodiment has the means to determine that a particular method or group of methods are executed very infrequently, compiling such a method might unnecessarily bloat the resulting snapshot in return for comparatively little performance improvement when the application is restored. Thus, the resulting method list includes any currently executing methods as well as any methods the currently executing methods could call when execution continues after the snapshot point, either in the original VM or a new instance restored from the snapshot. In an embodiment in which the method list includes code units that are not exclusively methods, to build the method list an embodiment analyzes the currently executing application to add currently executing code units to the method list, along with code units that could be executed from the snapshot point.

An embodiment maintains the method list in any presently known data structure. One non-limiting example of a data structure for the method list is a static call graph. A static call graph is a control flow graph which represents calling relationships between methods in a computer program. Each node in the graph represents a method, each edge (f, g) indicates that method f calls method g, and a cycle in the graph indicates recursive method calls.

During method list building, or after an embodiment has completed building the method list, an embodiment determines whether a method should be removed from the method list (or not initially added). An embodiment uses one or more criteria to determine whether a method should be filtered, or removed, from the method list. One non-limiting example of a criterion to determine whether a method should be removed is based on an analysis of a probability of execution of the method. For example, if a method will only execute if a condition is true, but the condition can never be true or has a probability under a threshold of being true, this method is not needed in the method list and can be removed without affecting future application performance. Similarly, a methods only called on an exception may not need to be compiled either. As another example, a method that is already part of all its calling methods (e.g. a methods incorporated as inline code) may not need to be separately compiled because its calling methods are compiled. As another example, when preparing a snapshot for an application framework to be used by other applications, some methods might need to be placed into a correct layer of the framework, so methods appropriate to a different layer might be removed from the method list.

When the snapshot handler is triggered at the snapshot point, an embodiment commits buffered profiling data into the JIT compiler's predetermined storage location. Committing the buffered profiling data at the snapshot point increases the amount of profiling data available for use by the JIT compiler. For example, in an experiment performed using one embodiment committing the buffered profiling data at the snapshot point doubled the amount of profiling data available for use by the JIT compiler.

An embodiment uses the JIT compiler to compile one or more methods in the method list, using the profiling data in the predetermined storage location. One embodiment compiles the code in read-only mode, so that the resulting snapshot is sharable among multiple process VM instances after a restore. Performing the compilation using as much profiling data as possible improves application throughput after the restore, without waiting for the application to reach a full performance level before taking the snapshot. In particular, because at the snapshot point some methods will have run sufficiently to accumulate excellent profiling, the resulting compilation will have correspondingly excellent throughput. Some methods will not have run sufficiently to accumulate excellent profiling, and the resulting compilation will have correspondingly mediocre throughput. However, the snapshot process has not be delayed by waiting for these methods to execute sufficiently to be compiled in the normal course of operation, and these methods can always be recompiled for improved throughput after the application is restored from the snapshot. In addition, the overall throughput is still higher than if the profiling information had not been used at all, as is the case with some presently-available solutions. In addition, the overall throughput is comparable to solutions requiring multiple training-type application executions, without performing those multiple executions.

Another embodiment uses the JIT compiler to compile differently-optimized versions of one or more methods in the method list, trading compile time and snapshot size for improved application throughput and reduced ramp-up on restore. Another embodiment uses the JIT compiler to compile two different versions of methods in the method list, one optimized normally and another compiled with debugging support enabled, allowing normal operation and debugging using a single snapshot after the restore.

Once an embodiment has compiled the methods, the embodiment stores the results of the compilation. One embodiment stores only one compilation result per method. Another embodiment stores two or more differently-optimized versions of a method in the snapshot, allowing different optimizations to be incorporated post-restore without having to recompile with the application executing. Another embodiment stores both a normally optimized compilation result and one with debugging support enabled, allowing normal operation and debugging using a single snapshot after the restore. An embodiment also stores additional snapshot data. Some non-limiting examples of the additional snapshot data are classes loaded up to the snapshot point and the VM heap populated by running some or all of the initializers for the classes loaded by the program up to the snapshot point.

When an application is restored from a snapshot, application profiling and JIT compiling proceed as for any normally executing process VM. New JIT compilations are expected to be a combination of recompilations of some performance critical methods originally compiled during the snapshot that could improve application throughput and initial compilations of methods from classes that were loaded after the restore. As a result, the restored application does arrive at peak performance, with a shorter startup time than when not utilizing the snapshot.

An embodiment is also usable to generate a native image at the snapshot point, while executing the application normally (i.e. without the language constraints of some presently-available solutions) and while benefiting from the profiling information already collected. The resulting native image is smaller the restored application, but will not have the improved throughput obtained by including the JIT compilations normally performed after restoration. In addition, every method or other code unit that could execute from the snapshot point would need to be compiled, because no interpreter or JIT compiler would be present in the native image and available to generate additional executable code.

The manner of a compilation strategy for a sharable application snapshot described herein is unavailable in the presently available methods in the technological field of endeavor pertaining to snapshotting in process VMs. A method of an embodiment described herein, when implemented to execute on a device or data processing system, comprises substantial advancement of the functionality of that device or data processing system in building, for a currently executing application within a process VM at a snapshot point, a list of methods capable of being executed after the snapshot point, committing collected profiling data of the application to a designated storage location, compiling the methods using the profiling data and a JIT compiler, and storing snapshot data including the compiled methods.

The illustrative embodiments are described with respect to certain types of process VMs, source code, bytecode, machine instructions, computer language structures, method lists, profiling data, predictions, thresholds, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
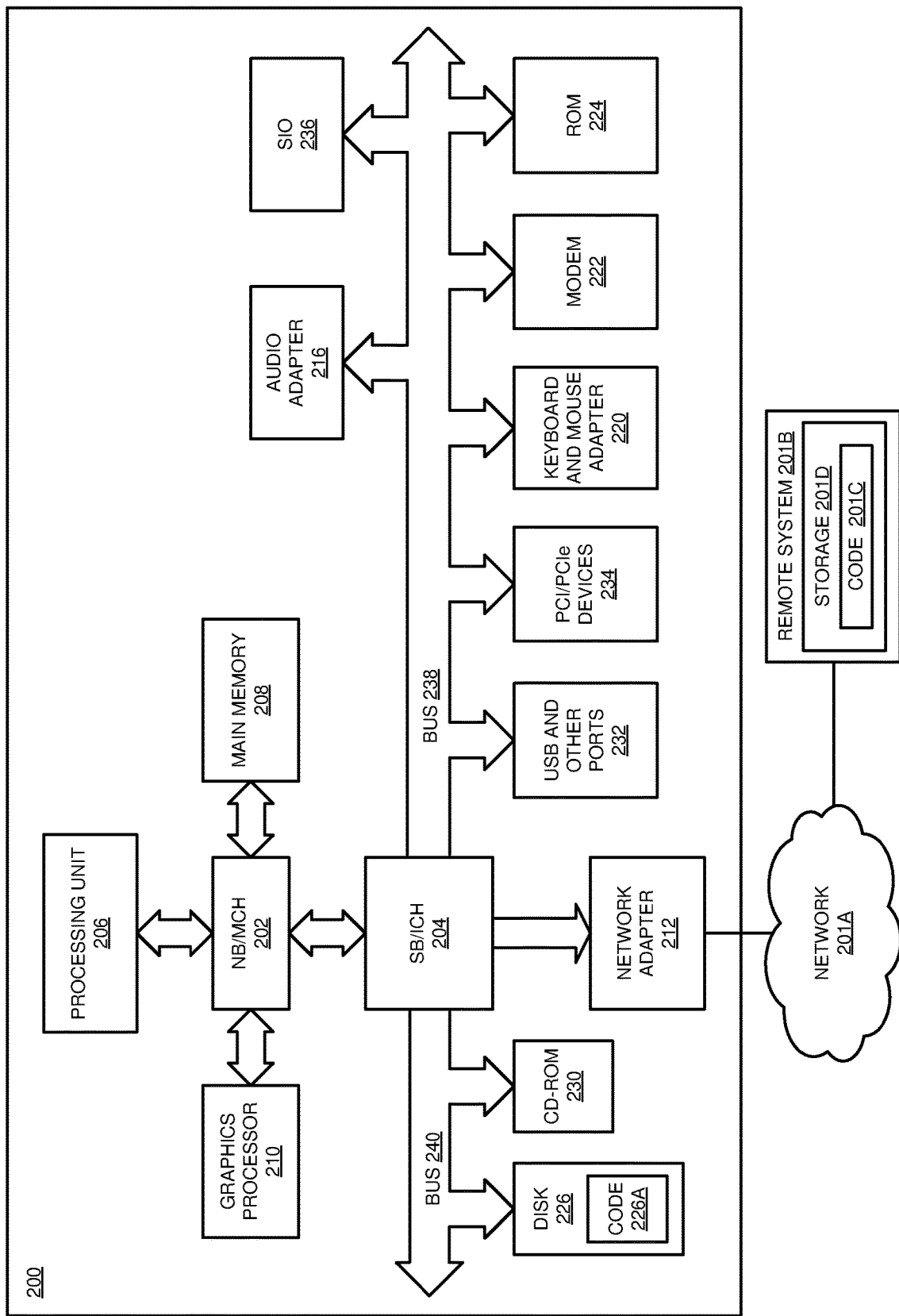
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
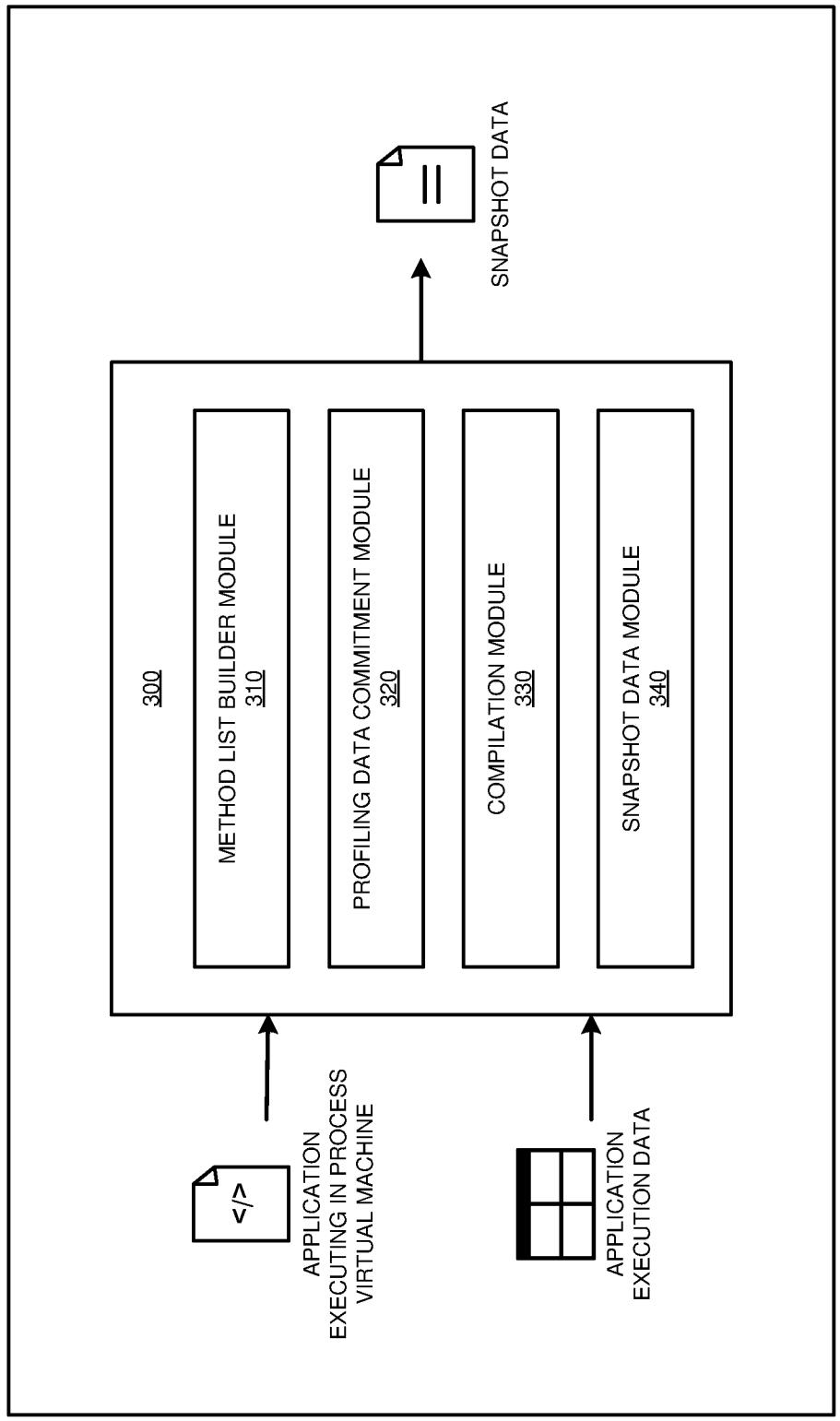
FIG. 3 depicts a block diagram of an example configuration for a compilation strategy for a sharable application snapshot in accordance with an illustrative embodiment.

With reference to FIG. 3, this figure depicts a block diagram of an example configuration for a compilation strategy for a sharable application snapshot in accordance with an illustrative embodiment. Application 300 is an example of application 105 in FIG. 1 and executes in any of servers 104 and 106, clients 110, 112, and 114, and device 132 in FIG. 1.

Application 300 begins executing an application within a process VM, with the process VM set to prevent compilation of any application code. Instead, application code is interpreted, using existing process VM functionality. As the application executes within the process VM prior to a snapshot point, application 300 collects profiling data of the application. Profiling data accumulates into one or more buffers. A point within application execution is selected as the snapshot point, and application 300 configures a snapshot handler to be triggered when application execution reaches the snapshot point.

When the snapshot handler is triggered at the snapshot point, method list builder module 310 builds a method list. The method list includes a set of methods capable of being executed by the currently executing application after the snapshot point. To build the method list, module 310 consults a call stack of an active thread of the application. Additional detail of module 310 is provided with reference to FIG. 4.

When a buffer approaches capacity, or at predetermined time intervals, profiled data commitment module 320 commits buffered data into a predetermined storage location, for use by the JIT compiler. As well, when the snapshot handler is triggered at the snapshot point, module 320 commits buffered profiling data into the JIT compiler's predetermined storage location. Committing the buffered profiling data at the snapshot point increases the amount of profiling data available for use by the JIT compiler.

Compilation module 330 uses the JIT compiler to compile one or more methods in the method list, using the profiling data in the predetermined storage location. Another implementation of module 330 uses the JIT compiler to compile differently-optimized versions of one or more methods in the method list, trading compile time and snapshot size for improved application throughput and reduced ramp-up on restore. Another implementation of module 330 uses the JIT compiler to compile two different versions of methods in the method list, one optimized normally and another compiled with debugging support enabled.

Snapshot data module 340 stores the results of the compilation. One implementation of module 340 stores only one compilation result per method. Another implementation of module 340 stores two or more differently-optimized versions of a method in the snapshot, allowing different optimizations to be incorporated post-restore without having to recompile with the application executing. Another implementation of module 340 stores both a normally optimized compilation result and one with debugging support enabled, allowing normal operation and debugging using a single snapshot after the restore. Module 340 also stores additional snapshot data.

Figure 4:
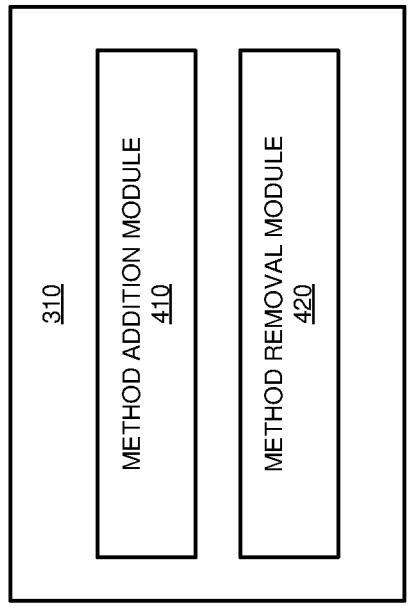
FIG. 4 depicts a block diagram of an example configuration for a compilation strategy for a sharable application snapshot in accordance with an illustrative embodiment.

With reference to FIG. 4, this figure depicts a block diagram of an example configuration for a compilation strategy for a sharable application snapshot in accordance with an illustrative embodiment. FIG. 4 depicts more detail of method list builder module 310 in FIG. 3.

To build the method list, method addition module 410 selects a method that was currently executing when the snapshot point was reached. Module 410 adds the selected method to the method list and determines whether the selected method can call another method. If so, module 410 adds the new method to the method list and determines whether the new method can itself call another method. Module 410 continues in this fashion, accumulating all the methods that could be called from the currently executing method. If another method was currently executing when the snapshot point was reached, module 410 repeats the process with that method. In addition, if multiple threads of the application were executing, module 410 repeats the process for another thread. Thus, the resulting method list includes any currently executing methods as well as any methods the currently executing methods could call when execution continues after the snapshot point, either in the original VM or a new instance restored from the snapshot. Module 410 maintains the method list in any presently known data structure, for example a static call graph.

During method list building, or after module 410 has completed building the method list, method removal module 420 determines whether a method should be removed from the method list (or not initially added). Module 420 uses one or more criteria to determine whether a method should be filtered, or removed, from the method list. One non-limiting example of a criterion to determine whether a method should be removed is based on an analysis of a probability of execution of the method. For example, if a method will only execute if a condition is true, but the condition can never be true or has a probability under a threshold of being true, this method is not needed in the method list and can be removed without affecting future application performance. Similarly, a methods only called on an exception may not need to be compiled either. As another example, a method that is already part of all its calling methods (e.g. a methods incorporated as inline code) may not need to be separately compiled because its calling methods are compiled. As another example, when preparing a snapshot for an application framework to be used by other applications, some methods might need to be placed into a correct layer of the framework, so methods appropriate to a different layer might be removed from the method list.

Figure 5:
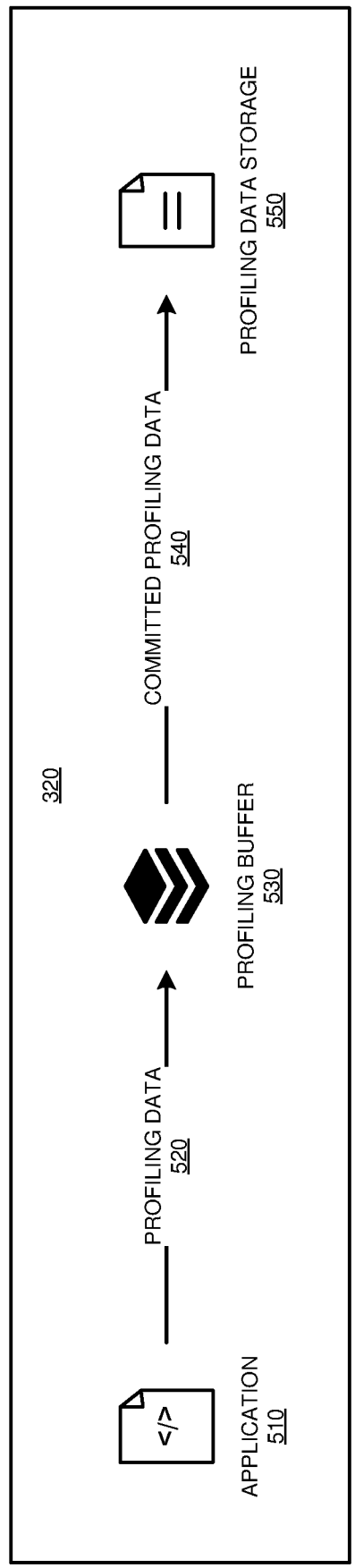
FIG. 5 depicts an example of a compilation strategy for a sharable application snapshot in accordance with an illustrative embodiment.

With reference to FIG. 5, this figure depicts an example of a compilation strategy for a sharable application snapshot in accordance with an illustrative embodiment. The example can be executed using application 300 in FIG. 3.

As depicted, application 510 begins executing in a process VM. As application 510 executes prior to a snapshot point, profiling data 520 accumulates into profiling buffer 530. When buffer 530 approaches capacity, or at predetermined time intervals, or at the snapshot point, application 300 transfers committed profiling data 540 into profiling data storage 550, for use by the JIT compiler.

Figure 6:
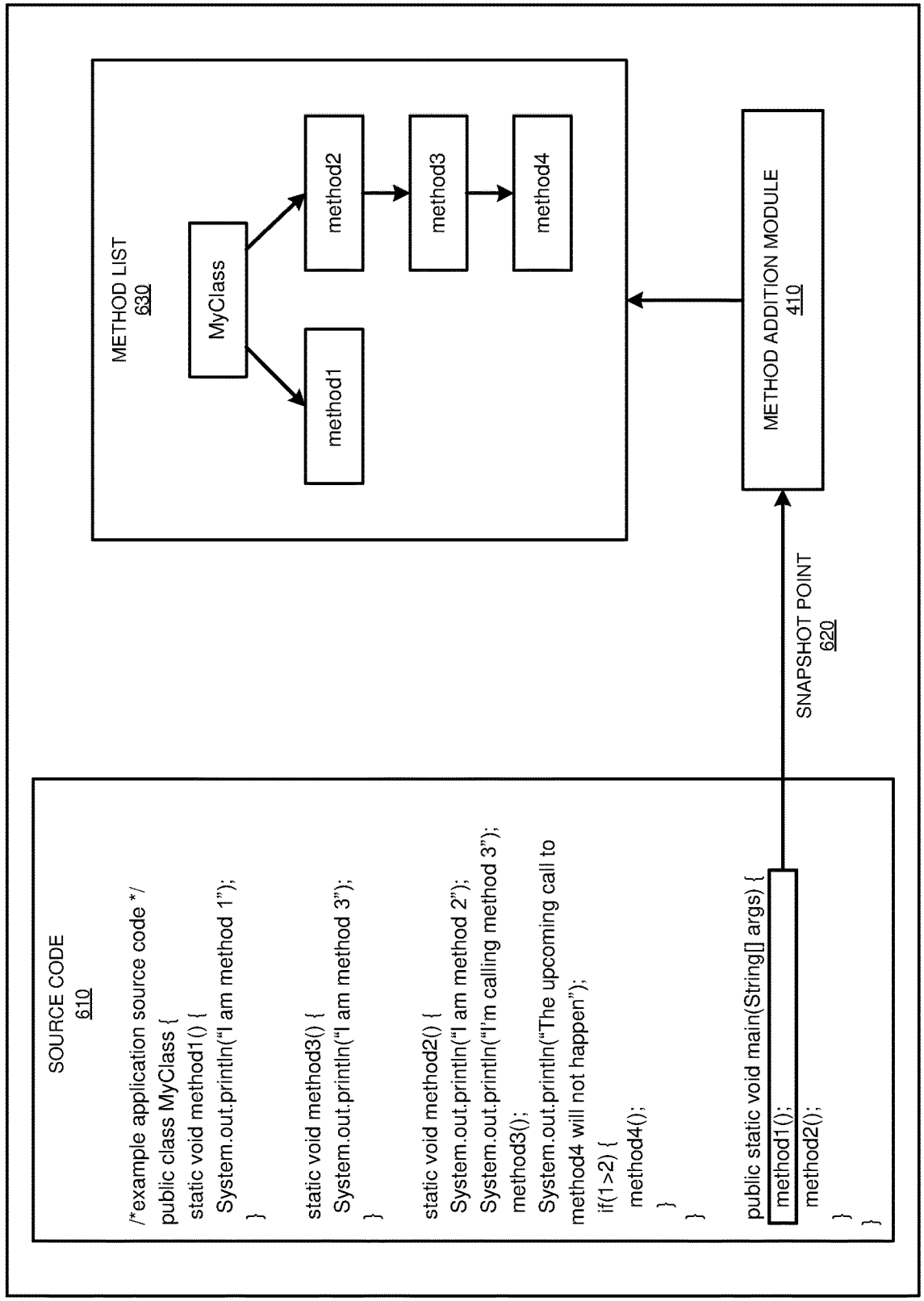
FIG. 6 depicts a continued example of a compilation strategy for a sharable application snapshot in accordance with an illustrative embodiment.

With reference to FIG. 6, this figure depicts a continued example of a compilation strategy for a sharable application snapshot in accordance with an illustrative embodiment. The example can be executed using application 300 in FIG. 3. Method addition module 410 is the same as method addition module 410 in FIG. 4.

Source code 610 is an example portion of executing application 510 in FIG. 5. As depicted, source code 610 calls method1( ) then method2( ). Method2( ) calls method3( ). Method2( ) includes code to call method4( ), but only if 1 is greater than 2, which will never happen.

Snapshot point 620 occurs while method1( ) within MyClass is executing. As a result, method addition module 410 constructs method list 630. MyClass and method1( ) are currently executing. Because method2( ) will be called after method1( ) method2( ) is also in method list 630, along with method3( ) and method4( ) because they can be called by method2( ).

Figure 7:
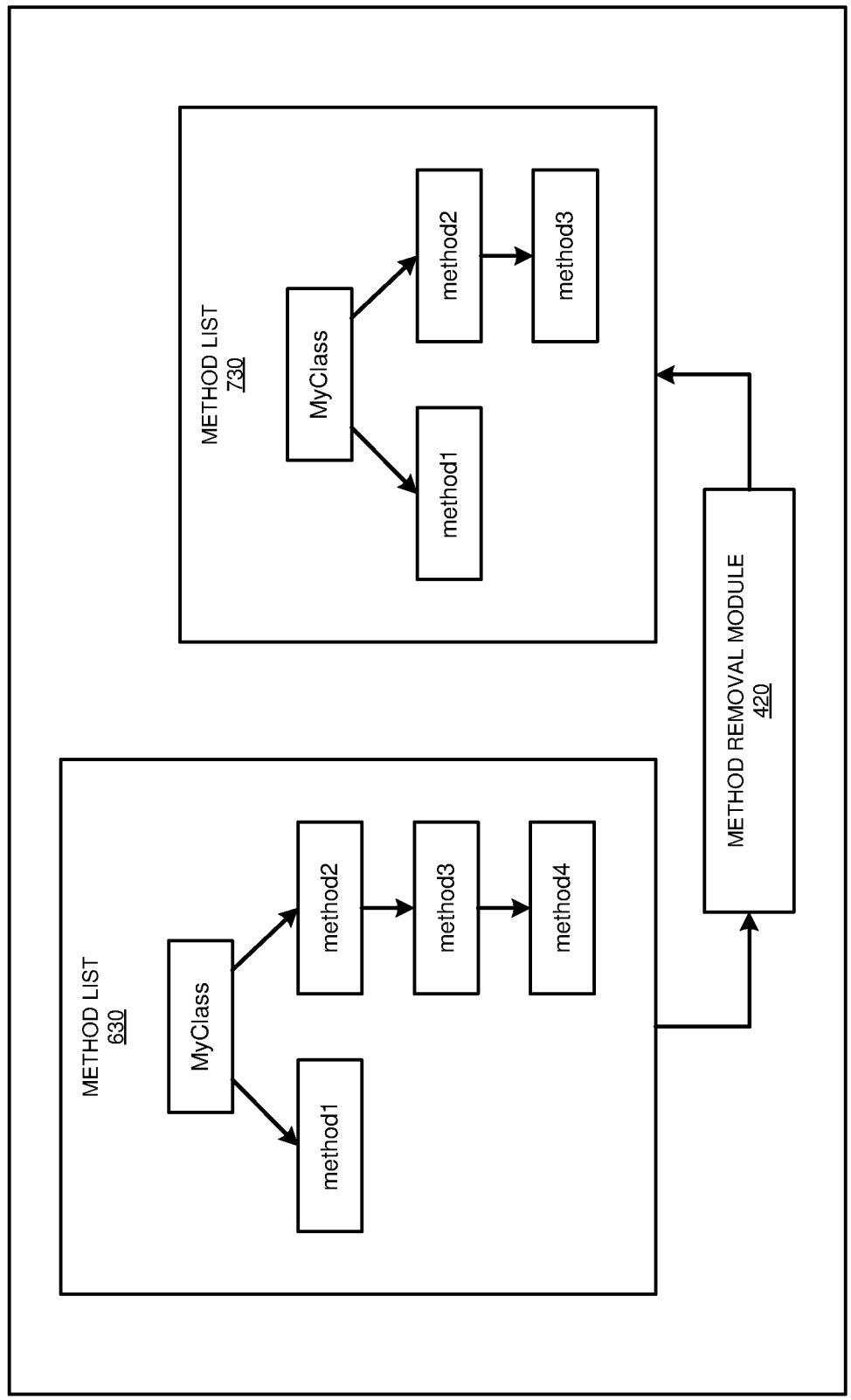
FIG. 7 depicts a continued example of a compilation strategy for a sharable application snapshot in accordance with an illustrative embodiment.

With reference to FIG. 7, this figure depicts a continued example of a compilation strategy for a sharable application snapshot in accordance with an illustrative embodiment. Method removal module 420 is the same as method removal module 420 in FIG. 4. Method list 630 is the same as method list 630 in FIG. 6.

Here, method removal module 420 determines that, because method2( ) includes code to call method4( ) only if 1 is greater than 2, which will never happen, method4( ) need not be compiled. Thus, module 420 removes method4( ) from method list 630, resulting in method list 730.

Figure 8:
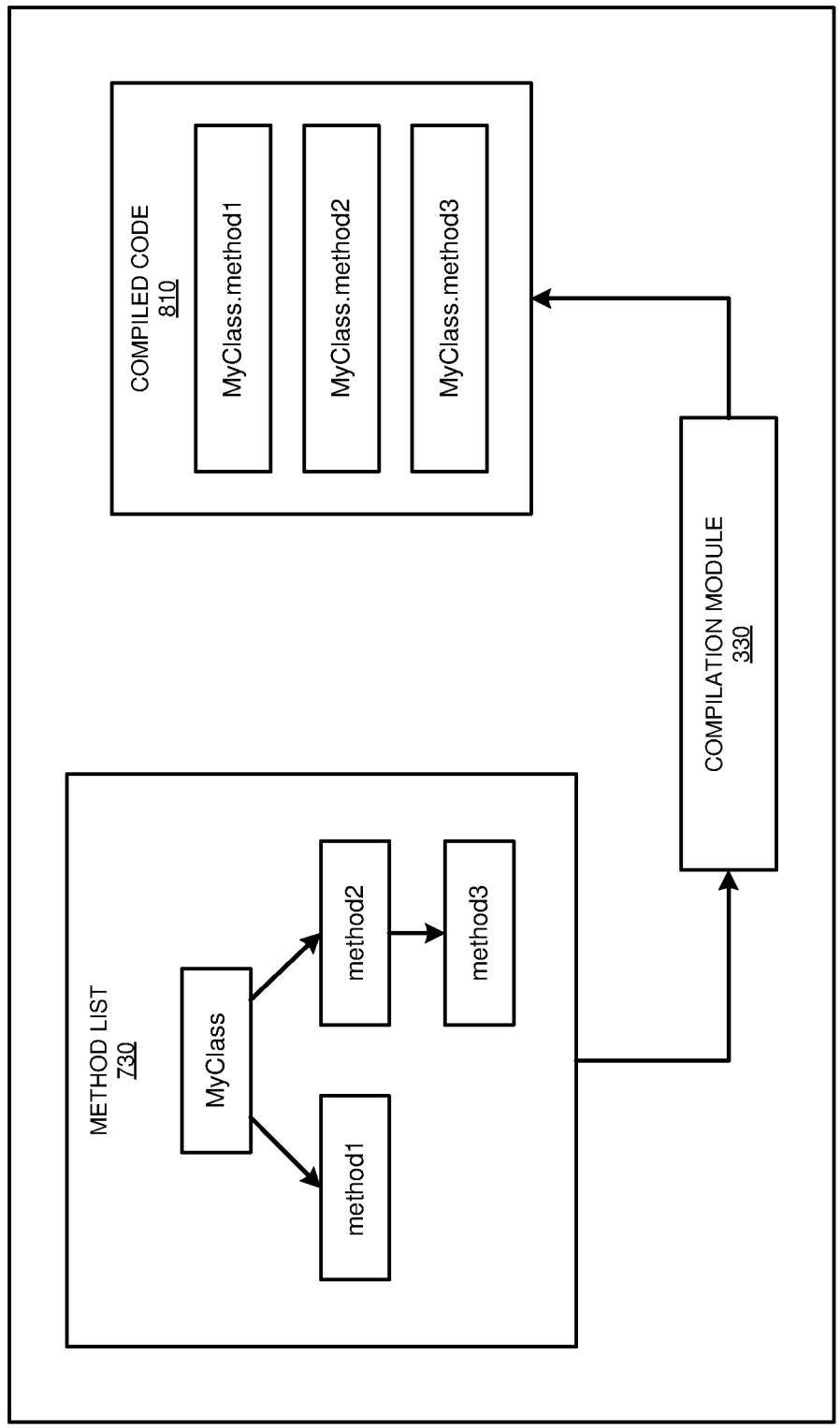
FIG. 8 depicts a continued example of a compilation strategy for a sharable application snapshot in accordance with an illustrative embodiment.

With reference to FIG. 8, this figure depicts a continued example of a compilation strategy for a sharable application snapshot in accordance with an illustrative embodiment. Compilation module 330 is the same as compilation module 330 in FIG. 3. Method list 730 is the same as method list 730 in FIG. 7. As depicted, compilation module 330 compiles each of the methods in method list 730, resulting in compiled code 810.

Figure 9:
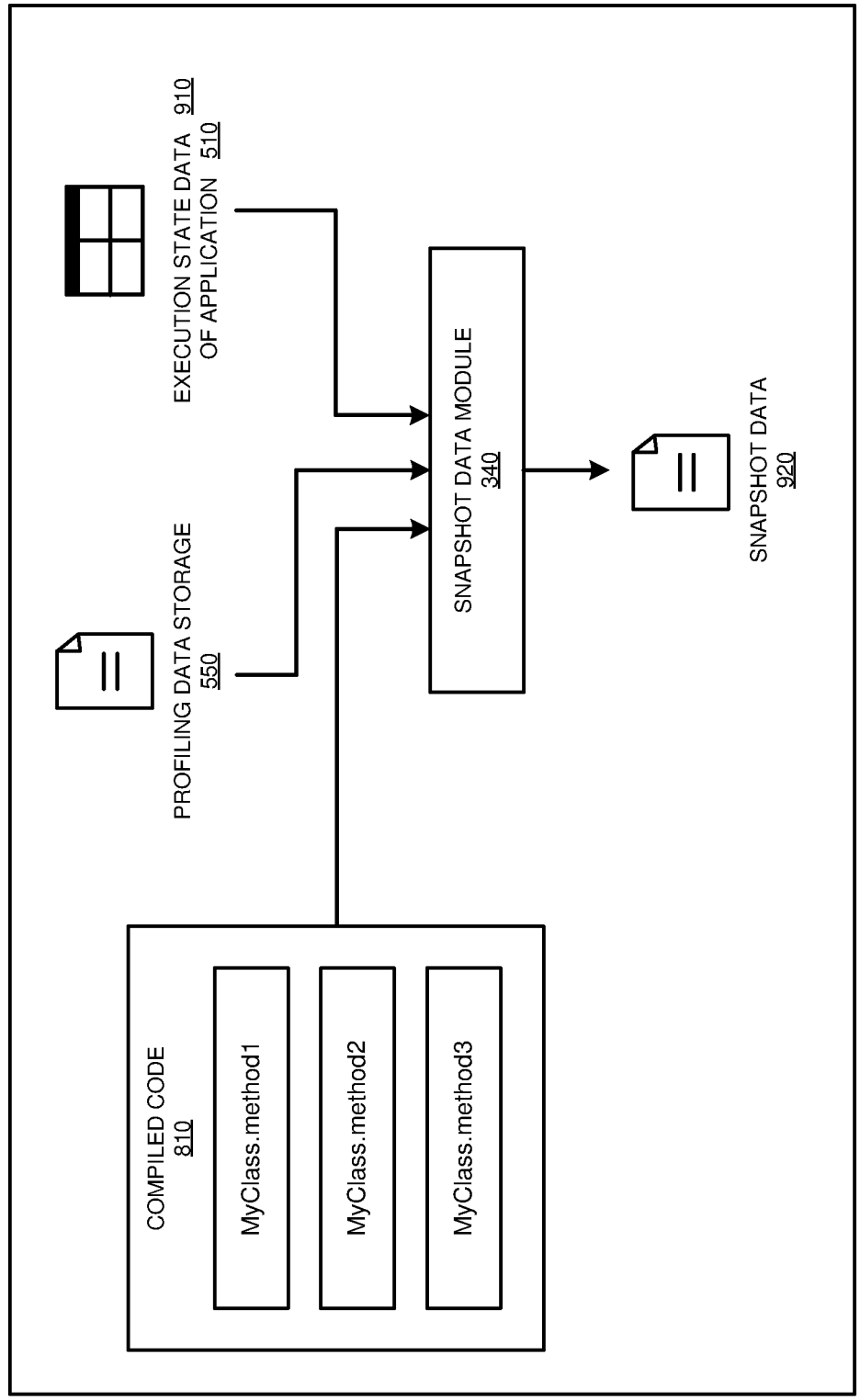
FIG. 9 depicts a continued example of a compilation strategy for a sharable application snapshot in accordance with an illustrative embodiment.

With reference to FIG. 9, this figure depicts a continued example of a compilation strategy for a sharable application snapshot in accordance with an illustrative embodiment. Snapshot data module 340 is the same as snapshot data module 340 in FIG. 3. Application 510 and profiled data storage 550 are the same as application 510 and profiled data storage 550 in FIG. 5. Compiled code 810 is the same as compiled code 810 in FIG. 8. As depicted, snapshot data module 340 incorporates compiled code 810, data from profile data storage 550, and execution state data 910 of application 510 into snapshot data 920.

Figure 10:
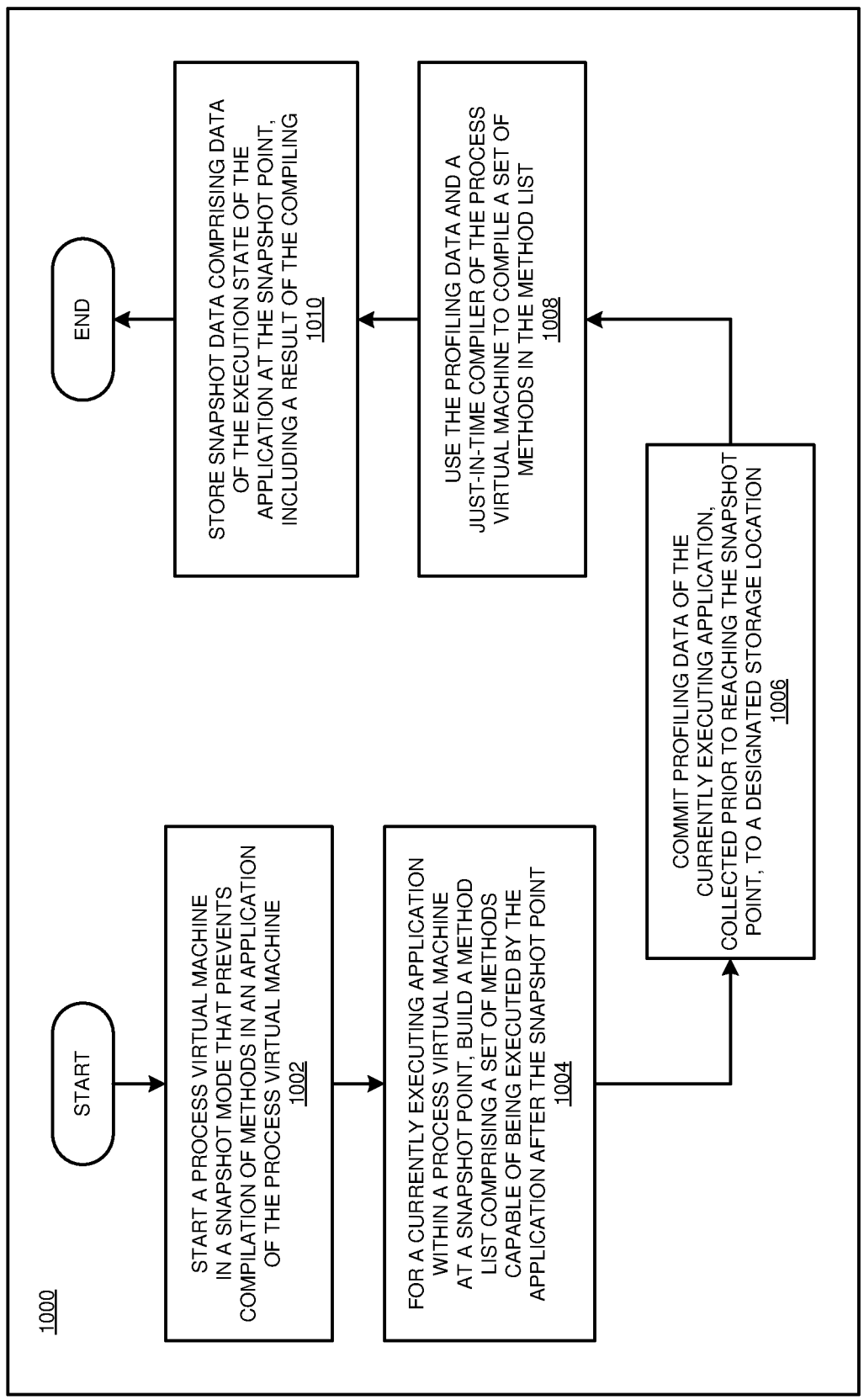
FIG. 10 depicts a flowchart of an example process for a compilation strategy for a sharable application snapshot in accordance with an illustrative embodiment.

With reference to FIG. 10, this figure depicts a flowchart of an example process for a compilation strategy for a sharable application snapshot in accordance with an illustrative embodiment. Process 1000 can be implemented in application 300 in FIG. 3.

In block 1002, the application starts a process virtual machine in a snapshot mode that prevents compilation of methods in an application of the process virtual machine. In block 1004, the application, for a currently executing application within a process virtual machine at a snapshot point, builds a method list comprising a set of methods capable of being executed by the application after the snapshot point. In block 1006, the application commits profiling data of the currently executing application, collected prior to reaching the snapshot point, to a designated storage location. In block 1008, the application uses the profiling data and a just-in-time compiler of the process virtual machine to compile a set of methods in the method list. In block 1010, the application stores snapshot data comprising data of the execution state of the application at the snapshot point, including a result of the compiling. Then the application ends.

Figure 11:
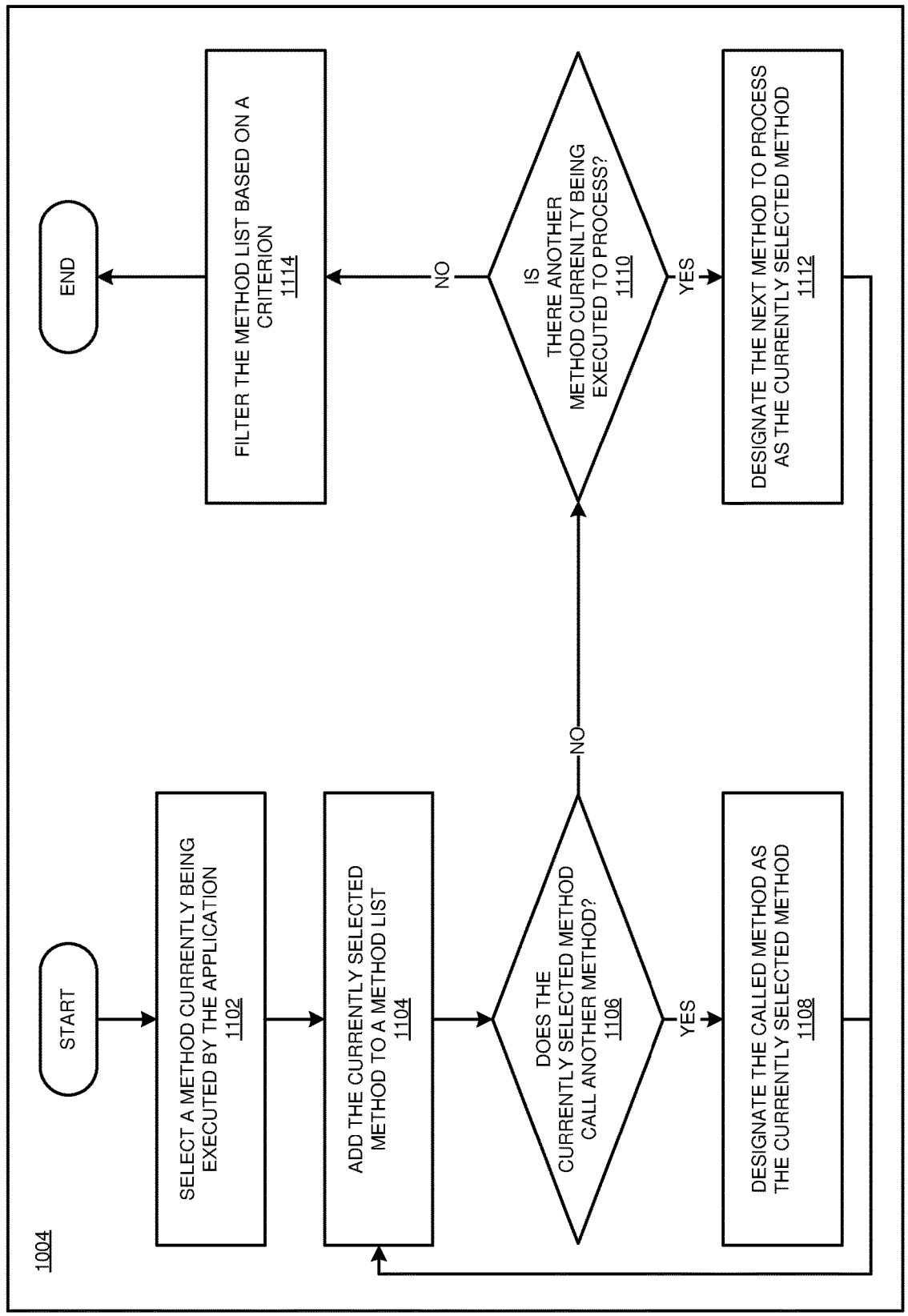
FIG. 11 depicts a flowchart of an example process for a compilation strategy for a sharable application snapshot in accordance with an illustrative embodiment.

With reference to FIG. 11, this figure depicts a flowchart of an example process for a compilation strategy for a sharable application snapshot in accordance with an illustrative embodiment. The flowchart depicts more detail of block 1004 in FIG. 10.

In block 1102, the application selects a method currently being executed by the application. In block 1104, the application adds the currently selected method to a method list. In block 1106, the application determines whether the currently selected method calls another method. If so ("YES" path of block 1106), in block 1108 the application designates the called method as the currently selected method, then returns to block 1104. Otherwise ("NO" path of block 1106), in block 1110 the application determines there is another currently executed method to process. If so ("YES" path of block 1110), in block 1112 the application designates the next method to process as the currently selected method, then returns to block 1104. Otherwise ("NO" path of block 1110), in block 1114 the application filters the method list based on one or more criteria. Then the application ends.

Figure 12:
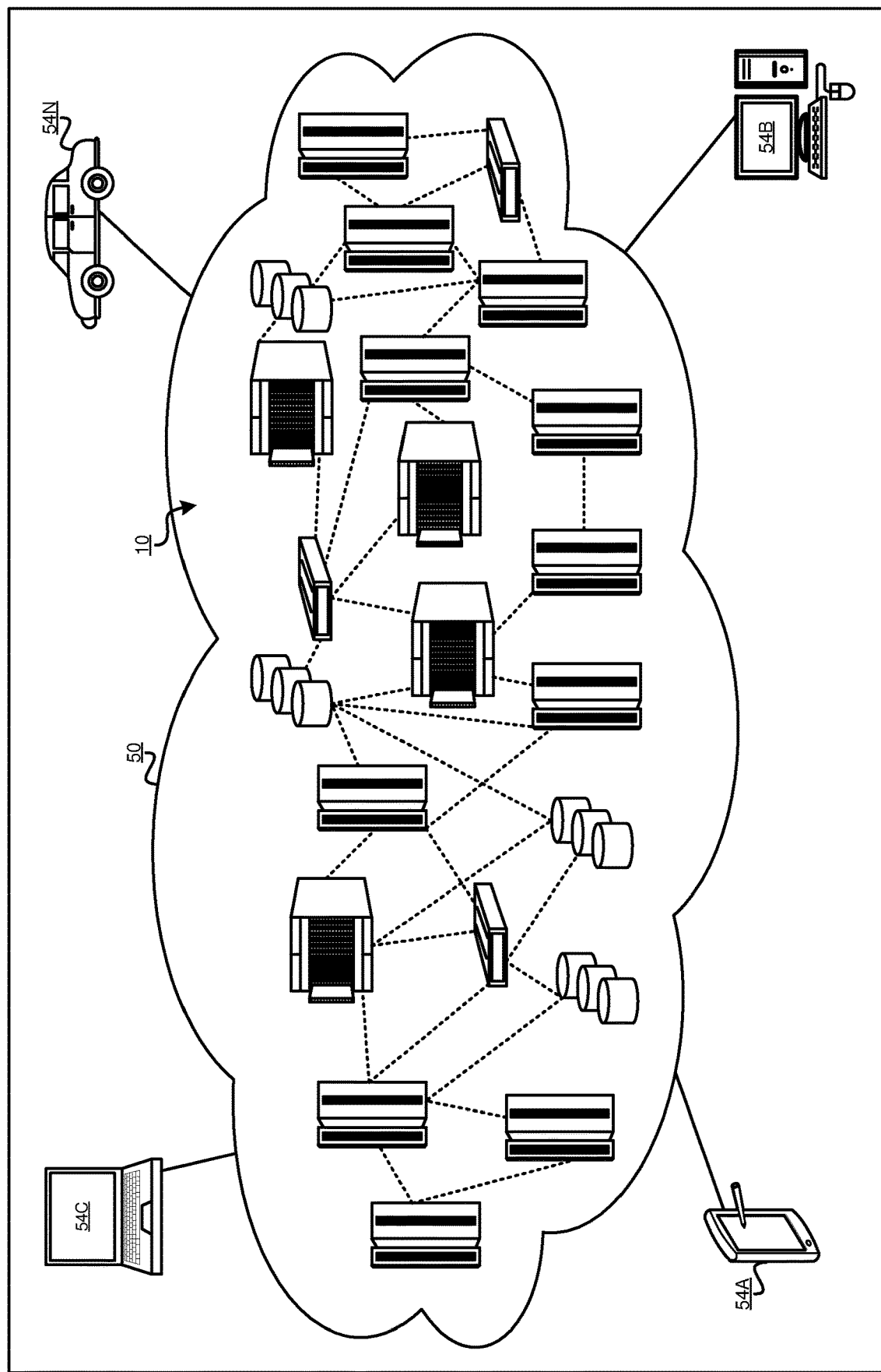
FIG. 12 depicts a cloud computing environment according to an embodiment of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 13:
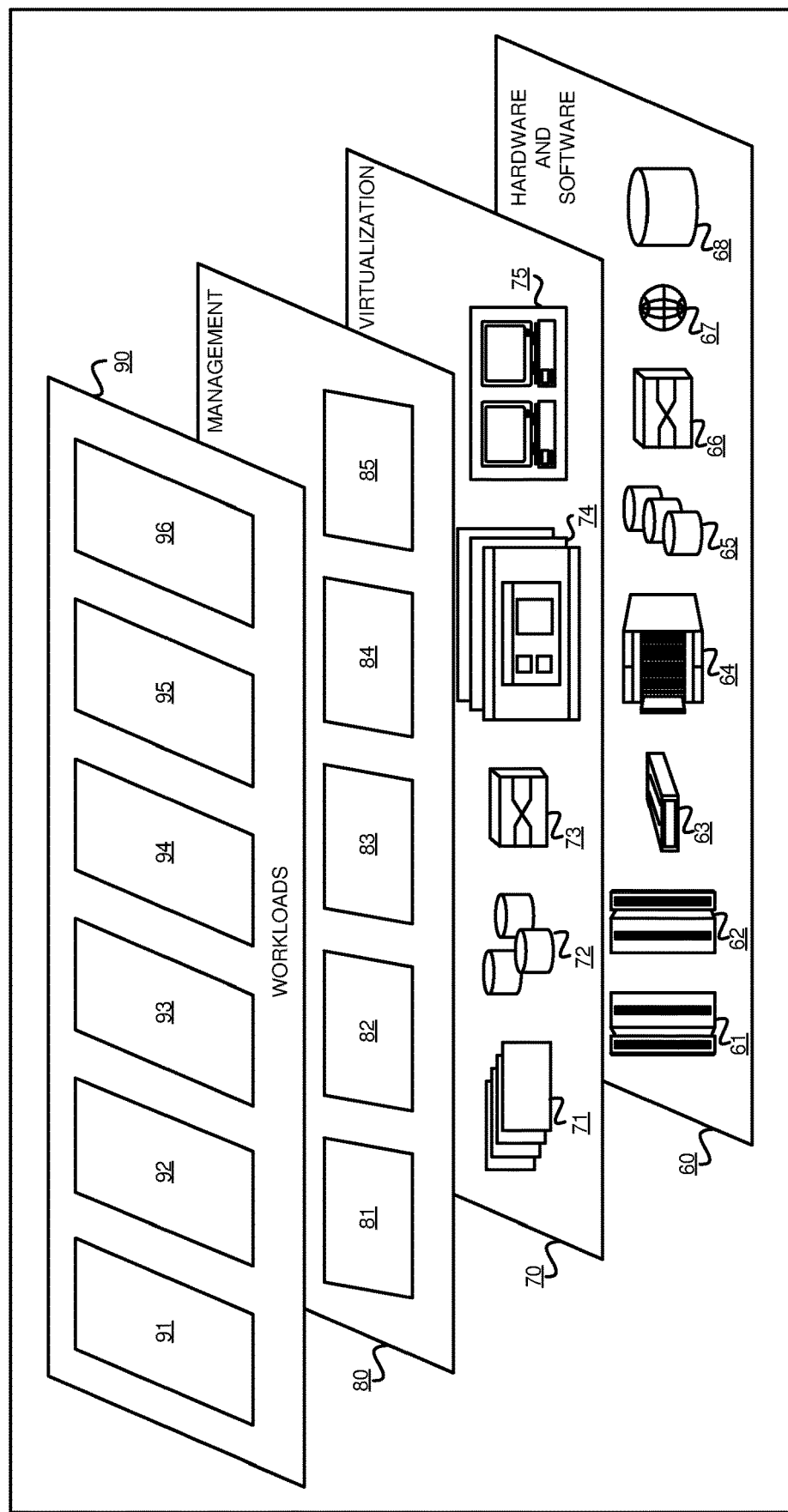
FIG. 13 depicts abstraction model layers according to an embodiment of the present invention.

Referring now to FIG. 13, a set of functional abstraction layers provided by cloud computing environment 50 (FIG. 12) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for a compilation strategy for a sharable application snapshot and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
building, for a currently executing application within a process virtual machine at a snapshot point, a method list, the method list comprising a set of methods capable of being executed by the currently executing application after the snapshot point, the snapshot point comprising an execution state of the currently executing application when a snapshot process is triggered;
committing, to a designated storage location, profiling data of the currently executing application, the profiling data collected prior to reaching the snapshot point;
compiling, using the profiling data and a just-in-time compiler of the process virtual machine, a method in the method list; and
storing snapshot data, the snapshot data comprising data of the execution state of the currently executing application at the snapshot point, the snapshot data including a result of the compiling.

2. The computer-implemented method of claim 1, further comprising:

preventing, for the currently executing application prior to the snapshot process being triggered, compilation of a method of the application.

3. The computer-implemented method of claim 1, further comprising:
collecting, for the currently executing application prior to the snapshot process being triggered, the profiling data.

4. The computer-implemented method of claim 1, wherein building the method list comprises:
adding, to the method list, a first method currently being executed by the currently executing application at the snapshot point; and
adding, to the method list responsive to determining that a second method is capable of being called by the first method, the second method.

5. The computer-implemented method of claim 4, further comprising:
adding, to the method list responsive to determining that a third method is capable of being called by the second method, the third method.

6. The computer-implemented method of claim 4, further comprising:
removing, responsive to determining that a characteristic of a third method in the method list meets a criterion, the third method from the method list.

7. The computer-implemented method of claim 6, wherein the criterion is based on an analysis of a probability of execution of the third method within the currently executing application.

8. A computer program product for a compilation strategy for a sharable application snapshot, the computer program product comprising:
one or more computer readable storage media, and program instructions collectively stored on the one or more computer readable storage media, the program instructions comprising:
program instructions to build, for a currently executing application within a process virtual machine at a snapshot point, a method list, the method list comprising a set of methods capable of being executed by the currently executing application after the snapshot point, the snapshot point comprising an execution state of the currently executing application when a snapshot process is triggered;
program instructions to commit, to a designated storage location, profiling data of the currently executing application, the profiling data collected prior to reaching the snapshot point;
program instructions to compile, using the profiling data and a just-in-time compiler of the process virtual machine, a method in the method list; and
program instructions to store snapshot data, the snapshot data comprising data of the execution state of the currently executing application at the snapshot point, the snapshot data including a result of the compiling.

9. The computer program product of claim 8, further comprising:
program instructions to prevent, for the currently executing application prior to the snapshot process being triggered, compilation of a method of the application.

10. The computer program product of claim 8, further comprising:
program instructions to collect, for the currently executing application prior to the snapshot process being triggered, the profiling data.

11. The computer program product of claim 8, wherein building the method list comprises:

program instructions to add, to the method list, a first method currently being executed by the currently executing application at the snapshot point; and
program instructions to add, to the method list responsive to determining that a second method is capable of being called by the first method, the second method.

12. The computer program product of claim 11, further comprising:
program instructions to add, to the method list responsive to determining that a third method is capable of being called by the second method, the third method.

13. The computer program product of claim 11, further comprising:
program instructions to remove, responsive to determining that a characteristic of a third method in the method list meets a criterion, the third method from the method list.

14. The computer program product of claim 13, wherein the criterion is based on an analysis of a probability of execution of the third method within the currently executing application.

15. The computer program product of claim 8, wherein the stored program instructions are stored in the at least one of the one or more storage media of a local data processing system, and wherein the stored program instructions are transferred over a network from a remote data processing system.

16. The computer program product of claim 8, wherein the stored program instructions are stored in the at least one of the one or more storage media of a server data processing system, and wherein the stored program instructions are downloaded over a network to a remote data processing system for use in a computer readable storage device associated with the remote data processing system.

17. The computer program product of claim 8, wherein the computer program product is provided as a service in a cloud environment.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to build, for a currently executing application within a process virtual machine at a snapshot point, a method list, the method list comprising a set of methods capable of being executed by the currently executing application after the snapshot point, the snapshot point comprising an execution state of the currently executing application when a snapshot process is triggered;
program instructions to commit, to a designated storage location, profiling data of the currently executing application, the profiling data collected prior to reaching the snapshot point;
program instructions to compile, using the profiling data and a just-in-time compiler of the process virtual machine, a method in the method list; and
program instructions to store snapshot data, the snapshot data comprising data of the execution state of the currently executing application at the snapshot point, the snapshot data including a result of the compiling.

19. The computer system of claim 18, further comprising:
program instructions to prevent, for the currently executing application prior to the snapshot process being triggered, compilation of a method of the application.

20. The computer system of claim 18, further comprising:
program instructions to collect, for the currently executing application prior to the snapshot process being triggered, the profiling data.

* * * * *